US011818725B2

(12) United States Patent
Wei et al.

(10) Patent No.: US 11,818,725 B2
(45) Date of Patent: Nov. 14, 2023

(54) METHODS AND APPARATUS FOR FLEXIBLE RESOURCE ALLOCATION

(71) Applicant: QUALCOMM Incorporated, San Diego, CA (US)

(72) Inventors: Chao Wei, Beijing (CN); Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/259,145

(22) PCT Filed: Aug. 6, 2019

(86) PCT No.: PCT/CN2019/099357
§ 371 (c)(1),
(2) Date: Jan. 8, 2021

(87) PCT Pub. No.: WO2020/029939
PCT Pub. Date: Feb. 13, 2020

(65) Prior Publication Data
US 2021/0274479 A1     Sep. 2, 2021

(30) Foreign Application Priority Data

Aug. 7, 2018   (WO) ................ PCT/CN2018/099221

(51) Int. Cl.
*H04W 72/10*     (2009.01)
*H04W 72/04*     (2023.01)
(Continued)

(52) U.S. Cl.
CPC ........ *H04W 72/23* (2023.01); *H04W 72/0453* (2013.01)

(58) Field of Classification Search
CPC ............................ H04W 72/042; H04W 72/23
See application file for complete search history.

(56) References Cited

U.S. PATENT DOCUMENTS

2010/0272032 A1* 10/2010 Sayana ................... H04L 5/006
2014/0307703 A1   10/2014 Gaal et al.
(Continued)

FOREIGN PATENT DOCUMENTS

CN        107734561 A      2/2018
CN        107872779 A      4/2018
(Continued)

OTHER PUBLICATIONS

Manolakos, PCT/CN2016/104562, Dec. 2017 (Year: 2017).*
(Continued)

*Primary Examiner* — Ronald B Abelson
(74) *Attorney, Agent, or Firm* — Procopio, Cory, Hargreaves & Savitch LLP

(57) ABSTRACT

The present disclosure relates to methods and devices for flexible resource allocation. In one aspect, a base station can generate a narrowband data channel including a plurality of resource blocks (RBs). The base station may shift a position of the RBs of the narrowband data channel to align with a wideband resource block group (RBG) boundary. The base station can also adjust a precoding resource block group (PRG) for the narrowband data channel. Also, the base station can transmit the narrowband data channel to a User Equipment (UE) based on adjusting the PRG. In another aspect, the base station may align a beginning or last RB of the plurality of RBs with the wideband RBG boundary and/or align a beginning or last RB of the PRG with the wideband RBG boundary. In another aspect, the base station may transmit an indication to the UE indicating a flexible resource allocation.

60 Claims, 15 Drawing Sheets

(51) Int. Cl.
*H04W 72/23* (2023.01)
*H04W 72/0453* (2023.01)

(56) References Cited

U.S. PATENT DOCUMENTS

| | | | |
|---|---|---|---|
| 2016/0338062 A1* | 11/2016 | Rico-Alvarino | H04B 1/713 |
| 2017/0290016 A1 | 10/2017 | Yi et al. | |
| 2017/0347268 A1 | 11/2017 | Chen et al. | |
| 2018/0102821 A1 | 4/2018 | Manolakos et al. | |
| 2018/0310300 A1* | 10/2018 | Lin | H04W 72/0413 |
| 2019/0190572 A1* | 6/2019 | Osawa | H04W 80/02 |
| 2019/0357307 A1* | 11/2019 | Ye | H04W 88/06 |

FOREIGN PATENT DOCUMENTS

| | | |
|---|---|---|
| WO | 2013056138 A1 | 4/2013 |
| WO | 2014117712 A1 | 8/2014 |
| WO | 2016043557 A1 | 3/2016 |
| WO | 2016161917 A1 | 10/2016 |
| WO | 2017000248 A1 | 1/2017 |
| WO | 2018025906 A1 | 2/2018 |
| WO | 2018059251 A1 | 4/2018 |

OTHER PUBLICATIONS

3rd Generation Partnership Project; Technical Specification Group Radio Access Network; Evolved Universal Terrestrial Radio Access (E-UTRA); Physical layer procedures, Release 15, 3GPP TS 36.213 V15.2.0, Jun. 2018, 536 Pages, sections 7.1.6.3, 7.1.6.5.
International Search Report and Written Opinion—PCT/CN2018/099221—ISA/EPO—dated Apr. 28, 2019 (9 pages).
International Search Report and Written Opinion—PCT/CN2019/099357—ISA/EPO—dated Oct. 28, 2019 (13 pages).
Supplementary European Search Report—EP19848149—Search Authority—Munich—dated Mar. 28, 2022 (9 pages).
Ericsson: "Flexible PDSCH/PUSCH Starting PRB for MTC", 3GPP TSG-RAN WG1 Meeting #93, R1-1805853,3rd Generation Partnership Project (3GPP), Mobile Competence Centre, 650, Route Des Lucioles, F-06921 Sophia-Antipolis Cedex, France, vol. RAN WG1, No. Busan, Korea, Feb. 21, 2018-May 25, 2018, May 20, 2018 (May 20, 2018), pp. 1-22, XP051441073, seciton 5.1, table 5.
Huawei, et al., "On More Flexible Starting PRB for PDSCH/PUSCH Resource Allocation", 3GPP TSG RAN WG1 Meeting #92bis, R1-1803888, Sanya, China, Apr. 16-20, 2018, 8 Pages, Apr. 7, 2018.
Qualcomm Incorporated: "Flexible Allocation for PDSCH and PUSCH for efeMTC", 3GPP TSG RAN WG1 Meeting #93, R1-1807106, Busan, Korea, May 21-25, 2018, 10 Pages, May 12, 2018.
Samsung: "Summary on Flexible PDSCH/PUSCH starting PRB", 3GPP TSG RAN WG1 Meeting #92, R1-1803050, Athens, Greece, Feb. 26-Mar. 2, 2018, 3 Pages, Feb. 28, 2018.

* cited by examiner

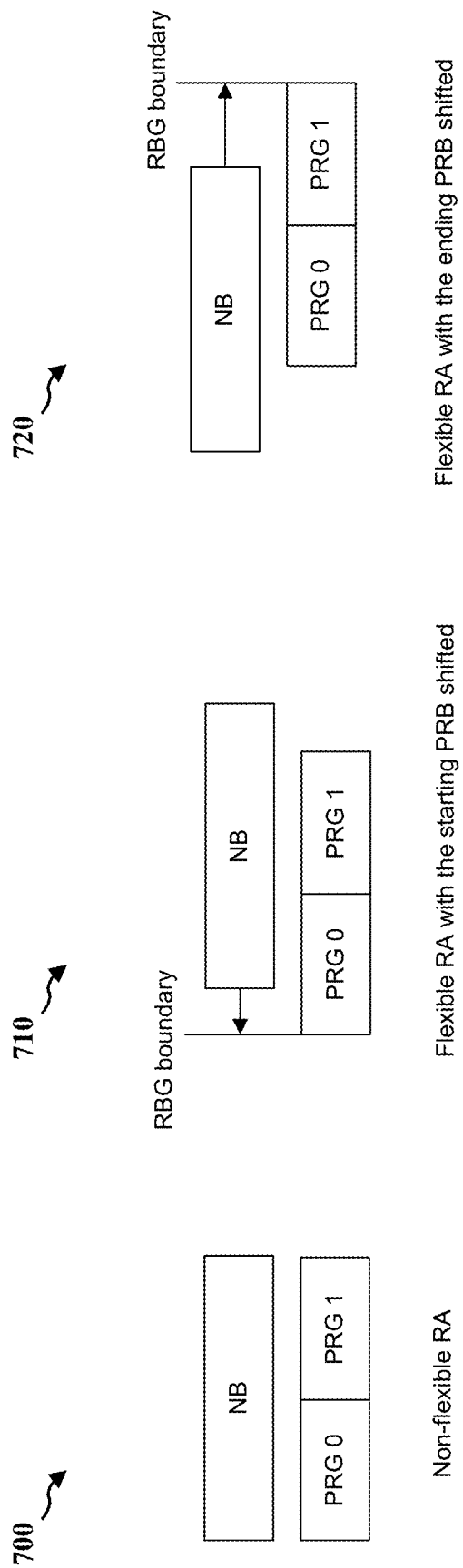

METHODS AND APPARATUS FOR FLEXIBLE RESOURCE ALLOCATION

CROSS REFERENCE TO RELATED APPLICATION(S)

This application is a National Stage Application filed under 35 U.S.C. § 371 of PCT International Patent Application Serial No. PCT/CN2019/099357, entitled "METHODS AND APPARATUS FOR FLEXIBLE RESOURCE ALLOCATION", and filed on Aug. 6, 2019, which claims the benefit of International Application No. PCT/CN2018/099221, entitled "METHODS AND APPARATUS FOR FLEXIBLE RESOURCE ALLOCATION" and filed on Aug. 7, 2018, each of which is expressly incorporated by reference herein in its entirety.

TECHNICAL FIELD

The present disclosure relates generally to communication systems, and more particularly, to methods and apparatus related to flexible resource allocation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Communication between a base station and a user equipment (UE) can include different types of data that is transmitted and/or received by the base station or UE. During transmission and/or reception, this data can be allocated over one or more resources. Presently, there exists a need to provide new and improved resource allocation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, e.g., millimeter wave (mmW) wireless communication, base stations and UEs can transmit and/or receive a multitude of data between each other. Such data can be allocated over one or more resources. In some instances, the data allocated over these resources can become too concentrated in certain areas. Accordingly, it can be advantageous and efficient to use a flexible allocation of at least some resources for the transmission and/or reception of data in order to reduce the concentration of the data. For instance, when data is too concentrated, it can reduce the efficiency of transmitting and/or receiving the data. By flexibly allocating resources, data can be more efficiently transmitted and/or received.

The present disclosure relates to methods and devices for flexible resource allocation, and more specifically physical resource block (PRB) bundling for flexible resource allocation in enhanced machine type communications (eMTC). In some aspects, a base station may transmit an indication of a flexible resource allocation to a UE. The indication can be transmitted in downlink control information (DCI). The base station can then configure a narrowband data channel which may include one or more resource blocks (RBs). A plurality of RBs can also be associated with a narrowband. In some aspects, the base station can shift a position of the plurality of RBs of the narrowband data channel to align with a wideband resource block group (RB G) boundary. Further, the base station can adjust a precoding resource block group (PRG) for the narrowband data channel based on the shifting of the plurality of RBs of the narrowband data channel. Also, the base station can transmit the narrowband data channel to the UE. At least some advantages of the aforementioned features are improving communication signaling, resource utilization, and/or power savings.

In other aspects, the base station can adjust the PRG for the narrowband data channel when the flexible resource allocation is indicated. The PRG for the narrowband data channel can also comprise one or more consecutive RBs. The base station can also align a beginning RB of the plurality of RBs with the wideband RBG boundary, as well as aligning the beginning RB of the PRG with the wideband RBG boundary. Further, base station can align a last RB of the plurality of RBs with the wideband RBG boundary, and align a last RB of the PRG with the wideband RBG boundary. At least some advantages of the aforementioned features are improving communication signaling, resource utilization, and/or power savings.

In further aspects, the base station can dynamically switch to an additional type of resource allocation, e.g., in which the narrowband data channel can be transmitted without adjusting the PRG for the narrowband data channel. Also, the base station can transmit a second indication to the UE indicating the additional type of resource allocation. The base station can also configure the UE for a flexible resource allocation, such that the PRG for the narrowband data channel can be adjusted based on the UE being configured for the flexible resource allocation. Additionally, the UE can be configured for the flexible resource allocation using radio resource control (RRC) signaling. At least some advantages of the aforementioned features are improving communication signaling, resource utilization, and/or power savings.

In an aspect of the disclosure, a method, a computer-readable medium, and an apparatus are provided for wireless communication at a base station. The apparatus can generate a narrowband data channel including a plurality of RBs. The apparatus can also shift a position of the plurality of RBs of the narrowband data channel to align with a wideband RBG boundary. Further, the apparatus can adjust a PRG for the narrowband data channel based on the shifting of the plurality of RBs of the narrowband data channel. Additionally, the apparatus can transmit the narrowband data channel to a UE based at least on adjusting the PRG. At least some advantages of the aforementioned features are improving communication signaling, resource utilization, and/or power savings.

In a further aspect of the disclosure, a method, a computer-readable medium, and an apparatus are provided for wireless communication at a UE. The apparatus can receive an indication of a flexible resource allocation from a base station. The apparatus can also receive a narrowband data channel from the base station including a plurality of RBs. A position of the plurality of RBs of the narrowband data channel can be shifted to align with a wideband RBG boundary. Also, a PRG for the narrowband data channel can be adjusted. At least some advantages of the aforementioned features are improving communication signaling, resource utilization, and/or power savings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A-7C display another example of resource allocation according to the present disclosure.

DETAILED DESCRIPTION

Figure 1:
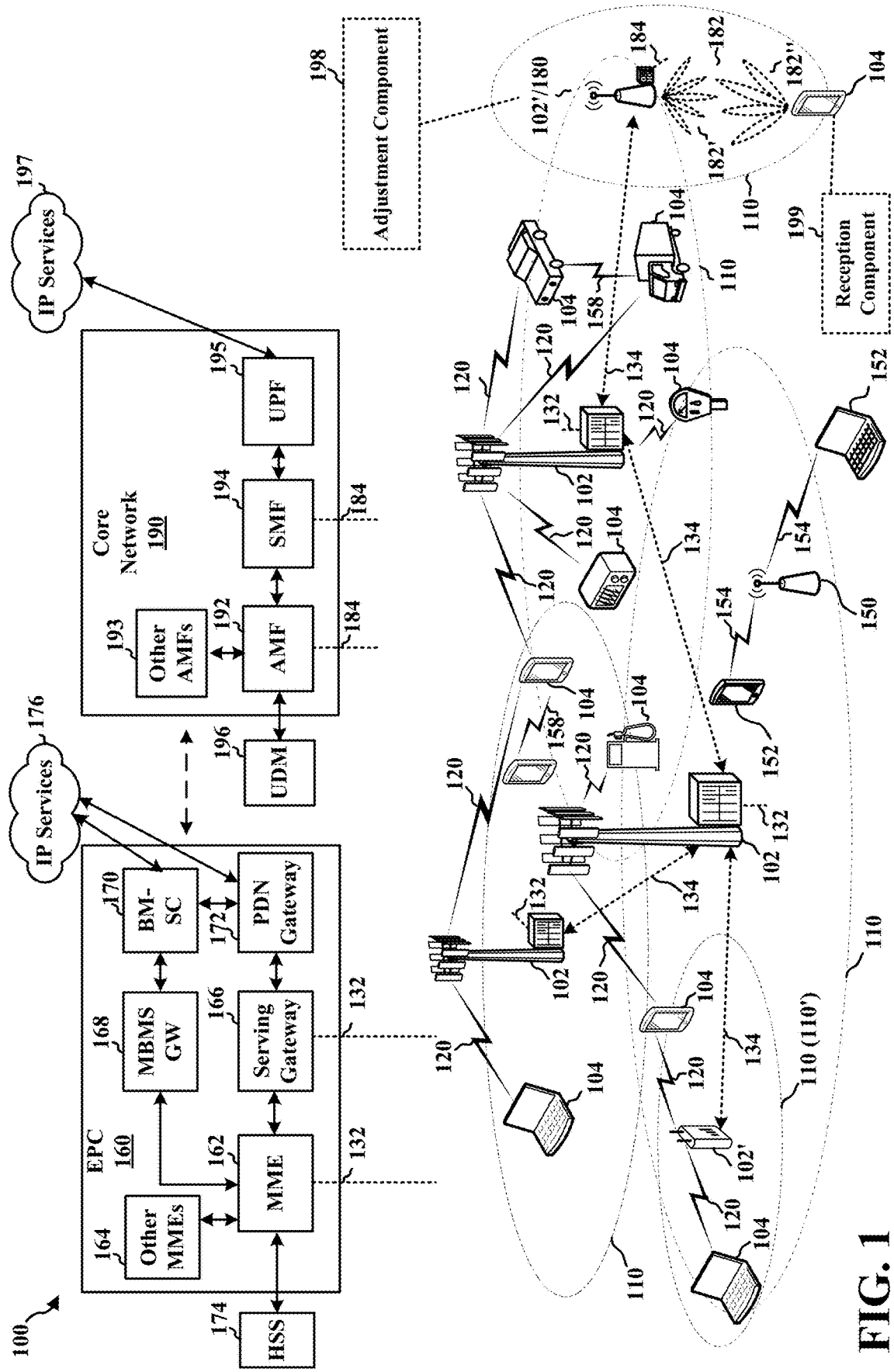
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, a 5G NR base station (gNodeB, gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102'/180 may include an adjustment component 198 configured to generate a narrowband data channel including a plurality of resource blocks (RBs). The adjustment component 198 may also be configured to shift a position of the plurality of RBs of the narrowband data channel to align with a wideband Resource Block Group (RBG) boundary. The adjustment component 198 may also be configured to adjust a Precoding Resource Block Group (PRG) for the narrowband data channel. The adjustment component 198 may also be configured to the narrowband data channel to a UE based at least on adjusting the PRG.

Additionally, UE 104 may include a reception component 199 configured to receive an indication of a flexible resource allocation from a base station. The reception component 199 may also be configured to receive a narrowband data channel from the base station including a plurality of RBs. In some aspects, a position of the plurality of RBs of the narrowband data channel can be shifted to align with a wideband Resource Block Group (RBG) boundary. In some aspects, a Precoding Resource Block Group (PRG) for the narrowband data channel can be adjusted.

Figure 2:
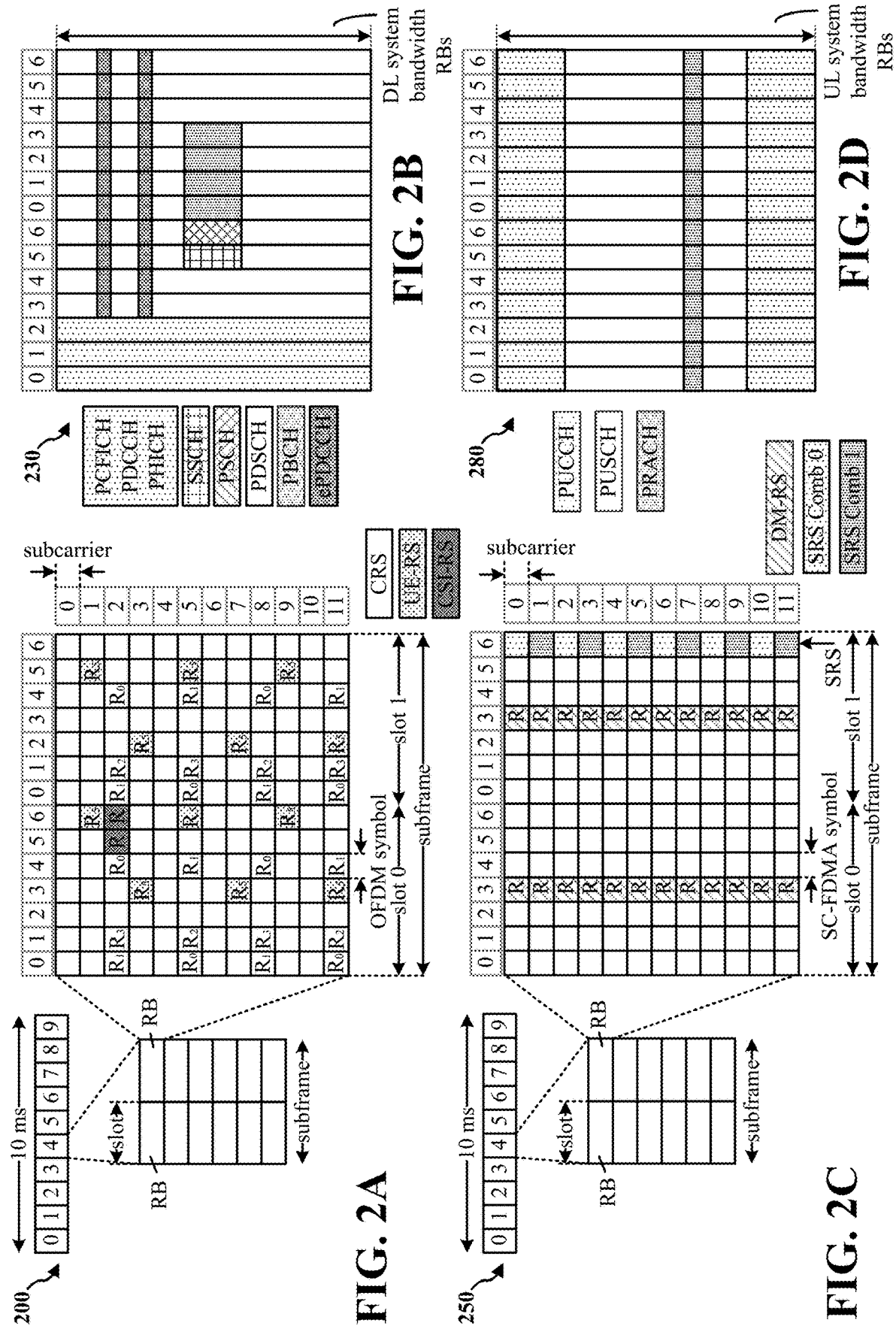
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
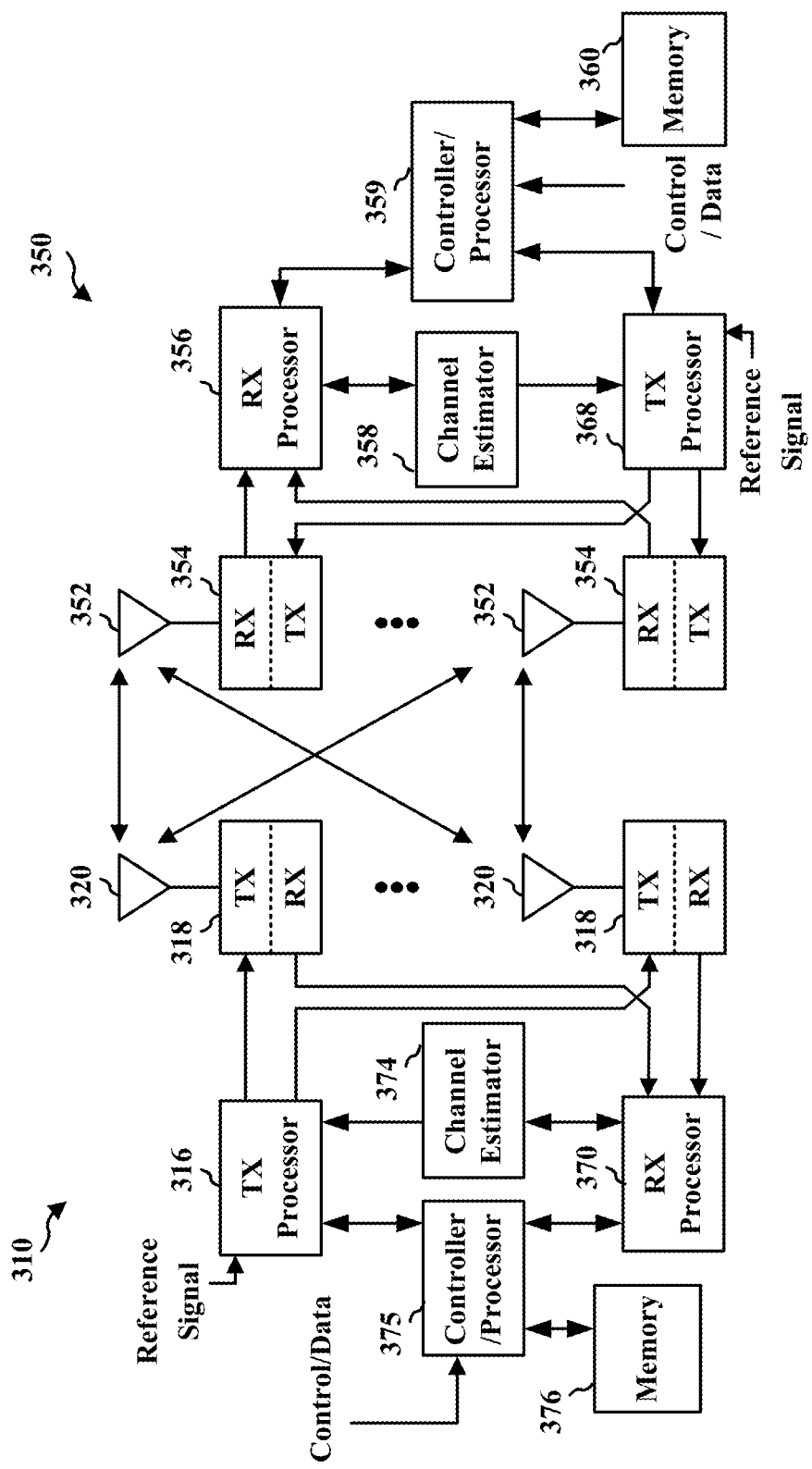
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

At least one of the TX processor 368, the RX processor 356, and the controller/processor 359 may be configured to perform aspects in connection with 199 of FIG. 1.

Figure 4:
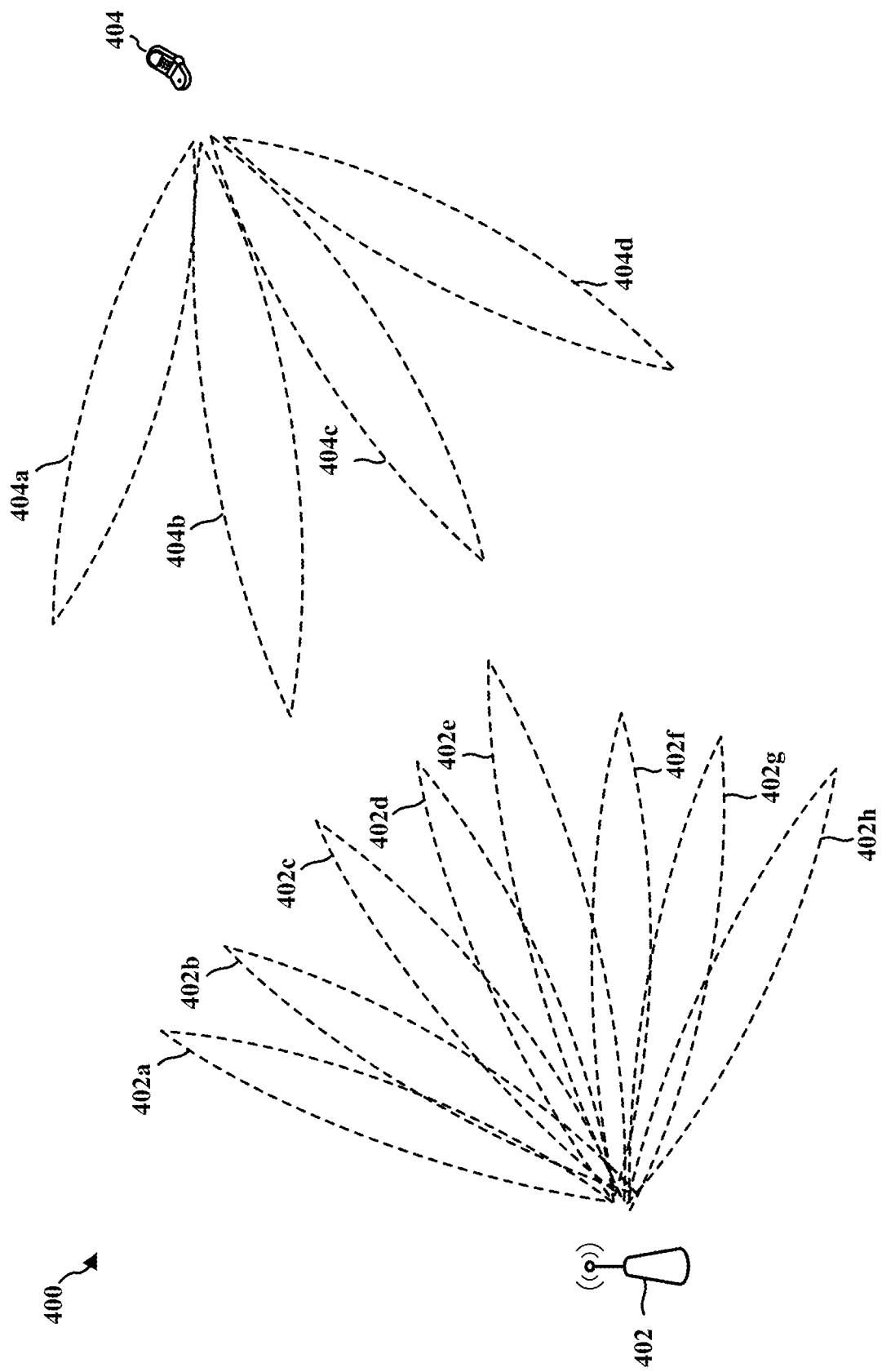
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In wireless communications, e.g., mmW wireless communication, base stations and UEs can transmit and/or receive a multitude of data between each other. Such data can be allocated over one or more resources. In some instances, the data allocated over these resources can obtain a number of undesirable characteristics, such as becoming too concentrated in certain areas. As such, it can be advantageous and efficient to flexibly allocate at least some resources. For instance, when data is too concentrated, it can reduce the efficiency of transmitting and/or receiving the data. By flexibly allocating resources, data can be more efficiently transmitted and/or received.

In some aspects of wireless communications, there can be a number of different communication modes. For instance, there can be a variety of downlink and/or uplink transmission modes. For example, in LTE, there can be 10 different downlink transmission modes. In further aspects, there may be a few transmission modes that are applicable for certain types of communications. For example, of 10 different downlink transmission modes in LTE, there may be a few transmission modes that are application to narrowband communication such as enhanced machine type communications (eMTC), e.g., transmission modes 1, 2, 6 and 9. Transmission mode 9 may correspond to a non-codebook based precoding that uses demodulation reference signals (DMRS) for PDSCH demodulation. In these instances, the same precoder may be applied to DMRS and PDSCH data.

Wireless communication may utilize PRB bundling for improved performance.

For instance, PRB bundling may be supported in certain transmission modes for improving channel estimation performance. Referencing the example above, transmission mode 9 may support PRB bundling to improve the channel estimation ability. Some aspects of wireless communication may use precoding granularity. If enabled, the precoding granularity may be multiple resource blocks in the frequency domain. That is, wireless communications may use the same precoder on all the PRBs within a precoding resource block group (PRG).

In some aspects of wireless communications, the size of a PRG may be based on certain resource sizes, such as a number of PRBs, depending on the system bandwidth. For example, in some aspects the PRG size can be one, two, or three PRBs. In one aspect of the present disclosure, the PRG of size P' may partition the system bandwidth and each PRG can comprise P' consecutive PRBs. In some aspects, the PRG size can even be based on a formula. For instance, in one aspect, if $N_{RB}^{DL}$ mod P'>0 then the last PRG size may be provided by $NRBDL - /P'\lfloor N_{RB}^{DL}/P' \rfloor$, wherein $N_{RB}^{DL}$ is the downlink system bandwidth.

A Resource Block Group (RBG) may be a number of resource blocks that are grouped and used as a unit of resource allocation. In some aspects of wireless communications, the PRG size may be designed to align with the size of other resource units. For instance, the PRG size can align with the size of a resource block groups (RBG), which can be the resource allocation unit in downlink communications. In some aspects of the present disclosure, each of the RBs in one RBG may correspond to the same PRG. For example, in certain system bandwidths of LTE wireless communications, such as 1.4 MHz, 3 MHz, 5 MHz, and/or 10 MHz, all the RBs in one RBG may comprise the same PRG. In aspects utilizing other system bandwidths, some RBs within the same RBG may have different PRGs. For instance, in some system bandwidths, e.g., 15 MHz and 20 MHz bandwidths, the first two RBs in one RBG can have the same PRG, while the other two RBs in one RBG can comprise a different PRG.

TABLE 1A

| System Bandwidth | PRG size (PRBs) |
| --- | --- |
| 1.4 MHz | 1 |
| 3 MHz, 5 MHz | 2 |
| 10 MHZ | 3 |
| 15 MHz, 20 MHz | 2 |

TABLE 1B

| System Bandwidth | RBG size (PRBs) |
| --- | --- |
| 1.4 MHz | 1 |
| 3 MHz, 5 MHz | 2 |
| 10 MHz | 3 |
| 15 MHz, 20 MHz | 4 |

Tables 1A and 1B display example grouping of RBs in the different RBG and PRGs. For example, some system bandwidths may correspond to the same PRG size, while other system bandwidths may correspond to another PRG size. As shown in Table 1A, in one aspect of the present disclosure, a system bandwidth of 3 MHz, 5 MHz, 15 MHz, and/or 20 MHz may correspond to a PRG size of 2 PRBs. In this aspect, a system bandwidth of 1.4 MHz may correspond to a PRG size of 1 PRB, while a system bandwidth of 10 MHz may correspond to a PRG size of 3 PRBs. As shown in Table 1B, these PRG size may not necessary correspond to the same RBG size. For instance, some bandwidths, e.g., 15 MHz and 20 MHz, may correspond to a PRG size of 2 PRBs and a RBG size of 4 PRBs. However, some bandwidths may correspond to the same PRG and RBG size. As shown in Table 1B, in some aspects, bandwidths 1.4 MHz, 3 MHz, 5 MHz, and 10 MHz may correspond to a PRG size of 1, 2, 2, and 3 PRBs, respectively, and also correspond to an RBG size of 1, 2, 2, and 3 PRBs, respectively.

For some types of narrowband wireless communication, e.g., eMTC, the PRG may partition the narrowband, rather than the system bandwidth. The PRG may partition the narrowband with a fixed PRG size, e.g., a fixed PRG size of 3 RBs. In this example of the fixed 3 RB size for the PRG, the RBs having RB indices 0 to 2 in the narrowband may correspond to the same PRG for a DMRS based transmission scheme. The RBs corresponding to RB indices 3 to 5 in the narrowband may correspond to a second PRG, the RBs for RB indices 6 to 8 may correspond to another PRG, and so forth. The examples above manifest that, in some aspects, resource allocation in eMTC can be based on a number of consecutive PRBs in one of multiple narrowbands rather than the RBG based allocation in LTE.

Figure 5:
FIG. 5 displays one example of resource allocation according to the present disclosure.

FIG. 5 illustrates one such example of different types of resource allocation 500 for RB indices 0 to 24. In FIG. 5, the RBs correspond to four different narrowbands, e.g., NB0, NB1, NB2, NB3, with the center PRB 12 not corresponding to any narrowband. FIG. 5 illustrates an example of PRGs in LTE having a size of 2 RBs. In contrast, the eMTC PRG size may use the fixed 3 RB size. Thus, as shown in FIG. 5, the same RB index can correspond to different PRGs in LTE and eMTC, respectively. As further illustrated in FIG. 5, the 25 PRBs correspond to 13 PRGs in LTE and eight PRGs in eMTC.

Some aspects of flexible resource allocation, e.g., flexible RB allocation (RA), can be utilized with different wireless communication channels. For instance, in some aspects, flexible RB allocation for the PDSCH may be used with narrowband communication such as eMTC to better coexist with other wideband wireless communications, such as LTE. Additionally, flexible RB allocation can allow for the efficient utilization of the downlink PRBs. In some aspects according to the present disclosure, this concept may shift the narrowband resource assignment for PDSCH by a certain amount of RBs. For example, the resource assignment for the PDSCH in eMTC may be shifted one, two, or three RBs to align with an LTE RBG boundary. In further aspects, the RB shift may be applied to either the starting PRB or the ending PRB of the resource assignment for the PDSCH.

In some aspects, the RB shift due to the flexible RB allocation may cause the assigned RBs to be outside of a narrowband, e.g., falling within two narrowbands. For example, in one aspect, if a legacy PRG with fixed PRG size of three RBs is reused for flexible RB allocation, the shifted assigned RBs may be outside of the narrowband causing the UE to assume a different precoding for the allocated RBs. This concept can take place even when the number of allocated PRBs is less than or equal to three. For example, if the RB allocation comprises 2 RBs and they are shifted to align to the LTE RBG boundary in a manner that causes the 2 RBs to not be in the same narrowband, then different precodings may need to be used for the two RBs.

Figures 6A, 6B:
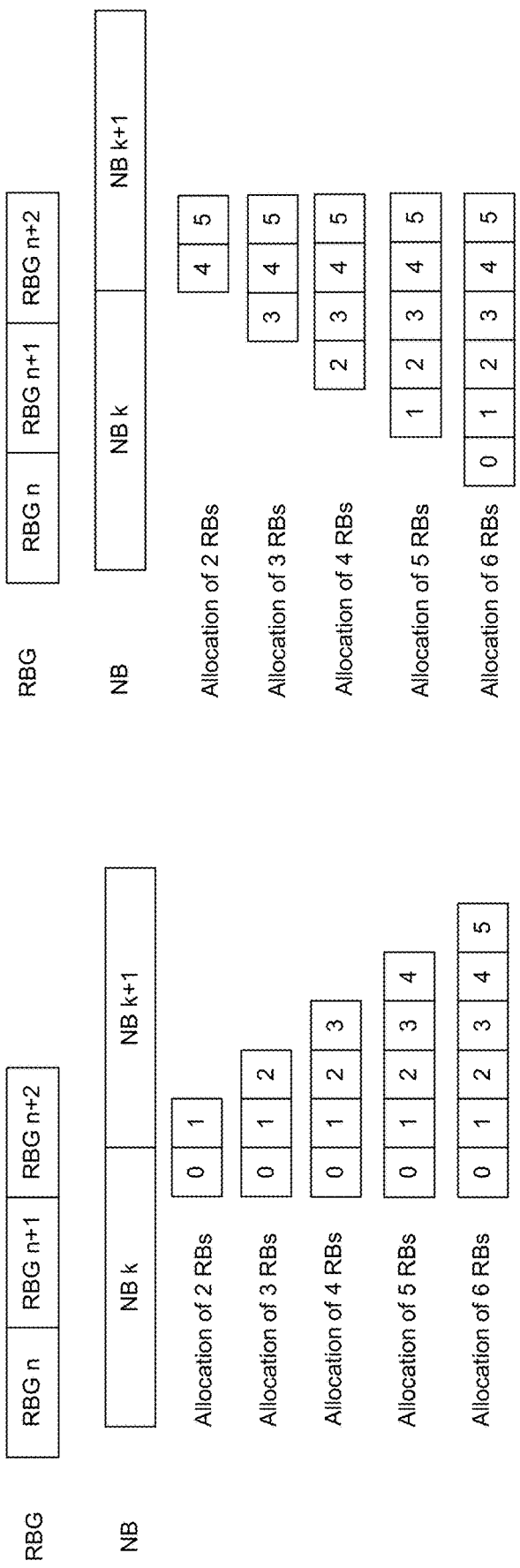
FIGS. 6A and 6B display another example of resource allocation according to the present disclosure.

FIGS. 6A and 6B display examples of flexible resource allocation 600 and 610, respectively, according to the present disclosure. As shown in FIGS. 6A and 6B, flexible RB allocation for the PDSCH according to the present disclosure can comprise shifting the starting PRB or the ending PRB to align with a wideband RBG, e.g., LTE RBG. For example, the resource assignment for the PDSCH may be moved to align the starting PRB with a wideband RBG or align the ending PRB with a wideband RBG. FIG. 6A displays the starting PRB including for resource allocation of different sizes. For example, FIG. 6A illustrates PDSCH resource allocations for two to six RBs. FIG. 6A also shows narrowbands k and k+1. In FIG. 6A, the flexible RB allocation shifts the allocation of RBs so that the beginning RB aligns with an LTE RBG boundary, e.g., the RBG N+2 boundary. As the boundary between NB k and NB k+1 does not align with the RBG boundary, while the first or '0' RB is illustrated in narrowband k, other RBs of the allocation are shifted into NB k+1. FIG. 6B displays the example in which the example PRB allocations for PDSCH are shifted such that the ending PRB is aligned with an LTE boundary. Each of the resource allocations have been shifted so that the ending RB ends at the end boundary of LTE RBG n+2. As illustrated, some of the RBs for the PDSCH fall within NB k+1, and others are shifted to NB k.

FIGS. 6A and 6B illustrate two examples of aligning the PRB with the LTE RBG boundary. FIGS. 6A and 6B also display that the narrowband boundary may be offset from the RBG boundaries. Accordingly, even though the resource assignment can be generated for either narrowband k or narrowband k+1, the RBs can be shifted to fall partially within the other of narrowband k or narrowband k+1.

As presented herein, a PRG may be adjusted in combination with a shift of the RBs based on the resource assignment for data. For example, when using flexible RA, the PRGs can be shifted to align with the LTE RBG boundary. For instance, in one aspect, if the starting RB for the narrowband PDSCH is aligned with the wideband RBG boundary, then the PRG for the narrowband PDSCH can be adjusted to start from the RBG boundary. In another aspect, if the ending RB of the narrowband PDSCH is aligned with the wideband RBG boundary, then the PRG for the narrowband PDSCH may be adjusted to end at the RBG boundary. Thus, whichever method of adjustment is employed, the PRG for the narrowband PDSCH can be aligned with the wideband RBG boundary.

FIGS. 7A-7C display some examples 710, 720 of adjusting PRGs for a narrowband PDSCH when utilizing flexible resource allocation. As indicated above, FIGS. 7A-7C illustrate an example of adjusting the PRG based on the resource assignment for the data. For example, the resource assignment for the beginning of the narrowband may be adjusted to align with the starting PRB or the ending of the narrowband may be adjusted align with the ending PRB. FIG. 7A displays an example of a non-flexible RB allocation. In the example 700 with the non-flexible RB allocation, the PRG is not adjusted and remains aligned with a boundary of the narrowband. More specifically, FIG. 7A shows the beginning boundary of PRG0 aligned with the beginning of narrowband (NB) and the end boundary of PRG1 aligned with the end of the narrowband. FIG. 7B illustrates an example 710 of a flexible RB allocation that includes adjusting the starting PRB. As shown in FIG. 7B, the starting RB for a narrowband PDSCH can be adjusted to align with the wideband RB G boundary left of the narrowband. In this example, the PRG for the narrowband PDSCH may also be adjusted to start from the RBG boundary. For instance, in FIG. 7B, PRG 0 is adjusted to align with the RBG boundary. FIG. 7C illustrates an example of a flexible RB allocation 720 that includes adjusting the ending PRB of the narrowband PDSCH to align with a wideband RBG boundary. As shown in FIG. 7C, the ending RB can be aligned with the LTE RBG boundary right of the narrowband, and the PRG for the narrowband PDSCH may also be aligned to end at from the wideband RBG boundary. For example, in FIG. 7C, PRG1 for the narrowband PDSCH is adjusted to align with the wideband RBG boundary.

Other aspects according to the present disclosure can utilize flexible resource allocation by reusing or overlapping certain PRGs. In some aspects, PDSCH for eMTC can use an LTE PRG when flexible RA is employed. For instance, when the RB allocation for the narrowband PDSCH is adjusted to align with the LTE RBG, the base station may use the LTE PRG for the eMTC PDSCH. Thus, the base station may apply at least one parameter from an LTE PRG to a narrowband PDSCH based on the type of resource allocation employed for the narrowband PDSCH. The parameter(s) may include a PRG boundary and/or size. Thus, for flexible RA, the base station may apply an LTE PRG boundary for a narrowband PDSCH. Further, in some aspects, the base station may apply an LTE PRG size for a narrowband PDSCH using flexible RA. For example, in aspects using a bandwidth of 5 MHz, the PRG size can be P'=2. In these aspects, in flexible RB allocation with 4 RBs, the RB indices 0-1 can be in one PRG and the RB indices 2-3 can be in another PRG.

In some aspects, when the LTE RBG size is 1, 2 or 3 RBs, the use of LTE PRG parameter(s) may be similar to the example described in connection with FIGS. 7B and 7C. For instance, using an LTE PRG boundary may lead to the same alignment with the LTE RBG boundary, with the exception of different PRG sizes. However, in certain aspects, such as when using 15 MHz and 20 MHz system bandwidths, the RBG size may be 4 RBs and PRG size may be 2 RBs. In these aspects, the starting or ending PRG may not be aligned with the RBG boundary.

Figures 8A, 8B, 8C:
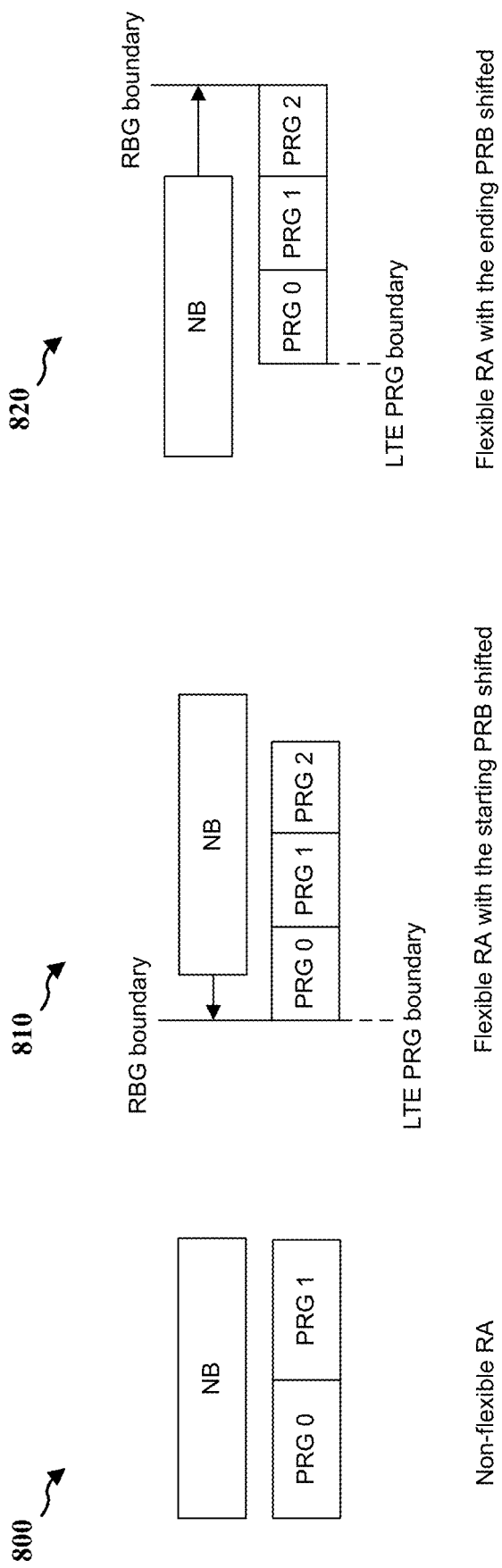
FIGS. 8A-8C display another example of resource allocation according to the present disclosure.

FIGS. 8A-8C display some further examples 810, 820 of adjusting narrowband PRGs when utilizing flexible resource allocation. As noted previously, FIGS. 8B-8C illustrate use of LTE PRG parameters in connection with flexible resource allocation for narrowband PDSCH. FIG. 8A displays an example 800 of a non-flexible RB allocation. As indicated in FIG. 8A, PRG boundaries are aligned with the narrowband boundary. FIG. 8B illustrates an example 810 of a flexible RB allocation for a narrowband that includes adjusting the starting PRB of a narrowband PDSCH to align with an LTE RB G boundary. In this example, the base station can use a boundary and/or size of the LTE PRG for the narrowband PDSCH. FIG. 8B displays three PRGs and the narrowband. As shown in FIG. 8B, the starting RB can be aligned with the wideband RBG boundary left of the narrowband, and the wideband PRG for the narrowband can start from the RBG boundary. For instance, in FIG. 8B, PRG 0 is adjusted to align with the RBG boundary. FIG. 8C illustrates an example 820 of a flexible RB allocation in which the ending PRB of the narrowband PDSCH is aligned with the wideband RBG boundary right of the narrowband, and the wideband PRG can be used for the narrowband PDSCH. FIG. 8C also shows that the LTE PRG boundary may not align with the narrowband boundary, but rather aligns with the wideband RBG boundary.

In some aspects according to the present disclosure, the adjustment of the PRG for flexible RB allocation can also be dependent on the configured coverage enhancement mode. For instance, in some aspects, the legacy RB allocation and flexible RB allocation can be dynamically indicated from the base station to the UE, e.g., using downlink control information (DCI). In certain aspects, the dynamic switching between the PRG for normal resource allocation and an adjusted PRG for flexible RA, using a DCI indication, can be employed for coverage enhancement (CE) mode A. Thus, in CE mode A, the PRG adjustment described in connection with any of FIG. 7B, 7C, 8B, or 8C can be utilized when flexible RB allocation is dynamically indicated for a narrowband PDSCH. In some aspects, the base station may use an unadjusted PRG, e.g., with a fixed size of three RBs, when the legacy RB allocation is dynamically indicated for the narrowband PDSCH. The unadjusted PRG may be referred to as a legacy PRG for the narrowband PDSCH described in connection with any of FIG. 7A or 8A. For example, the base station can dynamically switch between adjusting the PRG for the narrowband PDSCH and using a narrowband PRG without adjustment for the narrowband PDSCH with a corresponding dynamic DCI indication of flexible RB allocation.

In other aspects, a UE may be configured for legacy RA or flexible RB allocation using radio resource control (RRC) signaling. The RRC configuration for the type of resource allocation can be employed for CE mode B. Thus, the dynamic signaling may be employed for a first CE mode, e.g., CE mode A, and RRC configuration may be employed for a second CE mode, e.g., CE mode B. In some aspects, aspects described in connection with any of FIG. 7B, 7C, 8B, or 8C can be utilized when the flexible RB allocation is RRC configured for the UE receiving the narrowband PDSCH and the legacy PRG for flexible RB allocation is off. As such, according to some aspects of the present disclosure, there can be different PRG adjustments for different CE modes.

In some aspects, for narrowband UEs configured with CE mode A, and configured with higher layer parameter for flexible RB allocation for PDSCH, e.g., ce-pdsch-flexible-StartPrbAlloc-config, there can be certain formulas applied to determine the adjustment of the PRG. For instance, in some aspects, if $0 \leq RIV - N_{RB}^{DL}(N_{RB}^{DL}+1)/2 < 5$, wherein RIV is the resource indication value and $N_{RB}^{DL}$ corresponds to the narrowband bandwidth of 6 RBs, then the set of two PRGs may start from the starting resource block, $RB_{start}$. Additionally, in other aspects, if $5 \leq RIV - N_{RB}^{DL}(N_{RB}^{DL}+1)/2 < 10$, then the set of two PRGs may end at ($RB_{start}$ $L_{CRBs}-1$), wherein $L_{cRas}$ is the length in terms of virtually contiguously allocated resource blocks. And in other aspects, the set of two PRGs may be within the narrowband $n_{NB}$.

In other aspects, for narrowband UEs configured with CE mode B, and configured with a higher layer parameter for flexible RB allocation for PDSCH, e.g., ce-pdsch-flexible-StartPrbAlloc-config, the PRG adjustment may be determined in another manner. For instance, a set of PRGs, e.g., two PRGs, may start from the lowest RB of the narrowband $n_{NB}^{shifted}$ by $n_{NB}^{shift}$.

Figure 9:
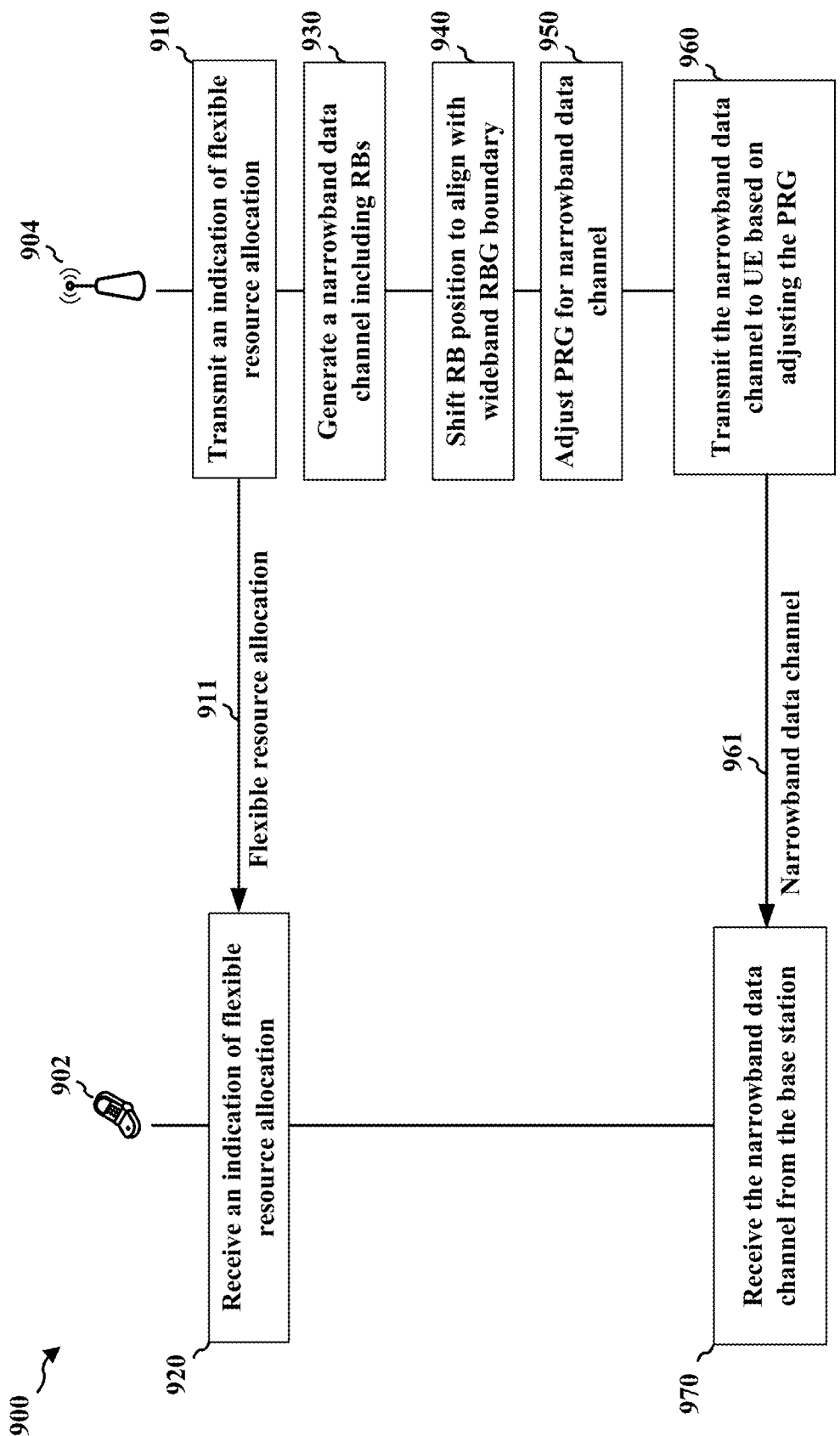
FIG. 9 is a diagram illustrating transmissions between a base station and a UE.

FIG. 9 is a diagram 900 illustrating transmissions between base station 904 and narrowband UE 902. For example, the UE may receive eMTC communication from the base station. Although this example is described for eMTC PDSCH, the aspects may be applied to other types of narrowband communication. For instance, base station 904 can transmit 910 an indication of a flexible RB allocation for an eMTC PDSCH 911 to UE 902. The indication can be transmitted in RRC signaling and/or may comprise a dynamic indication comprised in DCI. UE 902 can receive 920 the indication of a flexible RB allocation from base station 904. Base station can then generate 930 a narrowband data channel, e.g., an eMTC PDSCH, comprising multiple RBs. The plurality of RBs of the eMTC PDSCH may be associated with a narrowband, and the multiple RBs may be grouped into at least one or two PRGs. Next, base station 904 can shift 940 a position of the plurality of RBs of the narrowband data channel to align either a beginning of a plurality of RBs or an end of the plurality of RBs with a wideband RBG boundary, e.g., an LTE RBG boundary, as described in connection with the examples in 6A and 6B. While the example in FIG. 9 is described in connection with an LTE RBG boundary and LTE PRG, aspects presented herein may also be applied with other types of wideband communication. Further, base station 904 can adjust 950 a PRG for the eMTC PDSCH, as described in connection with the examples in any of 7B-7C and 8B-8C. Also, base station 904 can transmit 960 the eMTC PDSCH 961 to the UE based on the shifted PRB and the adjusted PRG. UE 904 can use the indication 911 to receive 970 the eMTC PDSCH 961 from base station 904.

In some aspects, base station 904 can adjust the PRG for the eMTC PDSCH when the flexible resource allocation is indicated. The PRG for the eMTC PDSCH can also comprise one or more consecutive RBs. Base station 904 can align a beginning RB of the a plurality of RBs with the LTE RBG boundary and can also align the beginning RB of the PRG for the eMTC with the LTE RBG boundary. Alternately, base station 904 can align a last RB of the plurality of RBs with the LTE RBG boundary, as well as align a last RB of the PRG for the eMTC PDSCH with the LTE RBG boundary. In other aspects, base station 904 can apply an LTE PRG parameter, e.g., an LTE PRG boundary and/or LTE PRG size, for the eMTC PDSCH.

In further aspects, base station 904 can dynamically switch to an additional type of resource allocation, e.g., in which the eMTC PDSCH can be transmitted without adjusting the PRG for the eMTC PDSCH. Thus, in some aspects, the base station may dynamically switch between using the adjusted PRG for the eMTC PDSCH and using a legacy, or unadjusted, PRG for eMTC PDSCH. The base station can transmit a second indication to UE 902 indicating the additional type of resource allocation. The dynamic indication may be comprised, e.g., in DCI. Base station 904 can also configure UE 902 for a flexible resource allocation, e.g., using RRC signaling.

Figure 10:
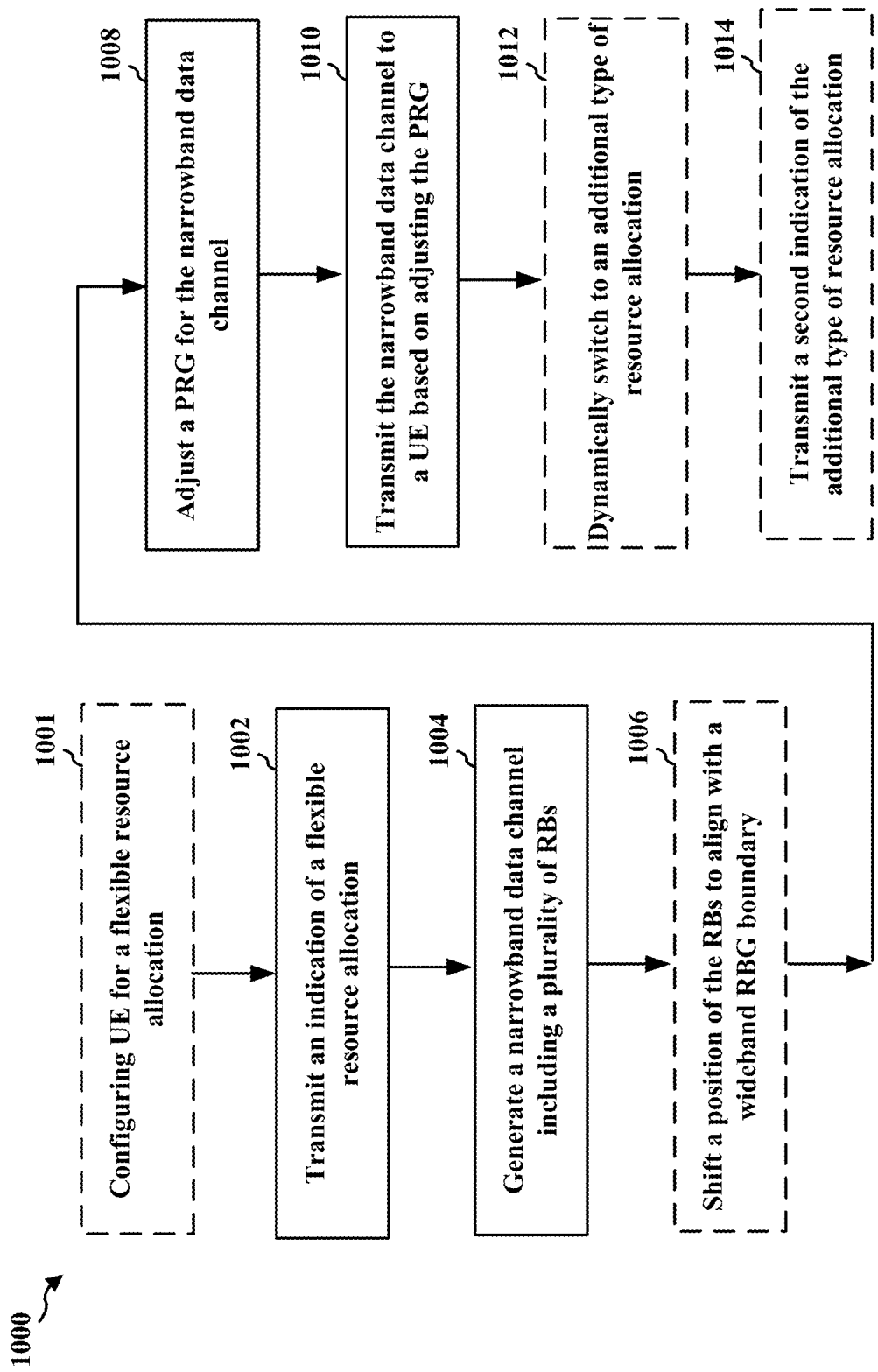
FIG. 10 is a flowchart of a method of wireless communication.

FIG. 10 is a flowchart 1000 of a method of wireless communication. The method may be performed by a base station or a component of a base station (e.g., base station 102, 180, 310, 402, 904, apparatus 1102; processing system 1214, which may include the memory 376 and which may be the entire base station or a component of the base station, such as the TX processor 316, the RX processor 370, and/or the controller/processor 375) communicating with a UE (e.g., UE 104, 350, 404, 902, apparatus 1402). Optional aspects are illustrated with a dashed line. The methods described herein can provide a number of benefits, such as improving communication signaling, resource utilisation, and/or power savings.

At 1002, the base station can transmit an indication of a flexible resource allocation to a UE indicating a flexible resource allocation. For example, transmission component 1120 of apparatus 1102 may transmit an indication of a flexible resource allocation to a UE. The indication can be transmitted in RRC and/or in DCI.

At 1004, the base station can generate a narrowband data channel, e.g., eMTC PDSCH, which may include one or more RBs. For example, generation component 1110 of apparatus 1102 may generate a narrowband data channel, e.g., eMTC PDSCH, which may include one or more RBs. The narrowband data channel may include a plurality of RBs associated with a narrowband.

At 1006, the base station can shift a position of the plurality of RBs of the narrowband data channel to align with a wideband RBG boundary when the flexible resource allocation is indicated, e.g., an LTE RBG boundary as described in connection with the examples in 6A and 6B. For example, shifting component 1112 of apparatus 1102 may shift a position of the plurality of RBs of the narrowband data channel to align with a wideband RBG boundary.

At 1008, the base station can adjust a PRG for the narrowband data channel based on the indication, as described in connection with the examples in 7B-7C and 8B-8C. For example, adjustment component 1114 of apparatus 1102 may adjust a PRG for the narrowband data channel.

At 1010, the base station can transmit the narrowband data channel to the UE based on adjusting the PRG. For example, transmission component 1120 of apparatus 1102 may transmit the narrowband data channel to the UE based on adjusting the PRG.

The base station can also adjust the PRG for the narrowband data channel when the flexible resource allocation is indicated. Also, the PRG for the narrowband data channel can comprise one or more consecutive RBs. The base station can align a beginning RB of the plurality of RBs with the wideband RBG boundary, at 1006, and may align the beginning RB of the PRG for the narrowband data channel with the wideband RBG boundary, at 1008. Alternately, the base station can align a last RB of the plurality of RBs with the wideband RBG boundary, at 1006, as well as align a last RB of the PRG for the narrowband data channel with the wideband RBG boundary, at 1008. In other aspects, the base station can apply a wideband PRG parameter, e.g., an LTE PRG boundary and/or size, for the narrowband data channel.

At 1012, the base station can dynamically switch to an additional type of resource allocation, e.g., in which the narrowband data channel can be transmitted without adjusting the PRG for the narrowband data channel. For example, DCI component 1106 of apparatus 1102 may dynamically switch to an additional type of resource allocation, e.g., in which the narrowband data channel can be transmitted without adjusting the PRG for the narrowband data channel.

At 1014, the base station can transmit a second indication, e.g., in DCI, to the UE indicating the additional type of resource allocation. For example, transmission component 1120 of apparatus 1102 may transmit a second indication, e.g., in DCI, to the UE indicating the additional type of resource allocation.

At 1001, the base station can also configure the UE for a flexible resource allocation, such that the PRG for the narrowband data channel can be adjusted based on the UE being configured for the flexible resource allocation. For example, RRC component 1108 of apparatus 1102 may configure the UE for a flexible resource allocation. The UE can be configured for the flexible resource allocation using RRC signaling. Thus, the indication transmitted to the UE at 1002 may comprise RRC signaling that indicates the flexible RB allocation configuration to the UE. The indication at 1004 may differ, e.g., based on CE mode. For example, a dynamic DCI indication may be employed for CE mode A, whereas RRC configuration may be employed for CE mode B. In some aspects, a size of the PRG can be fixed.

Figure 11:
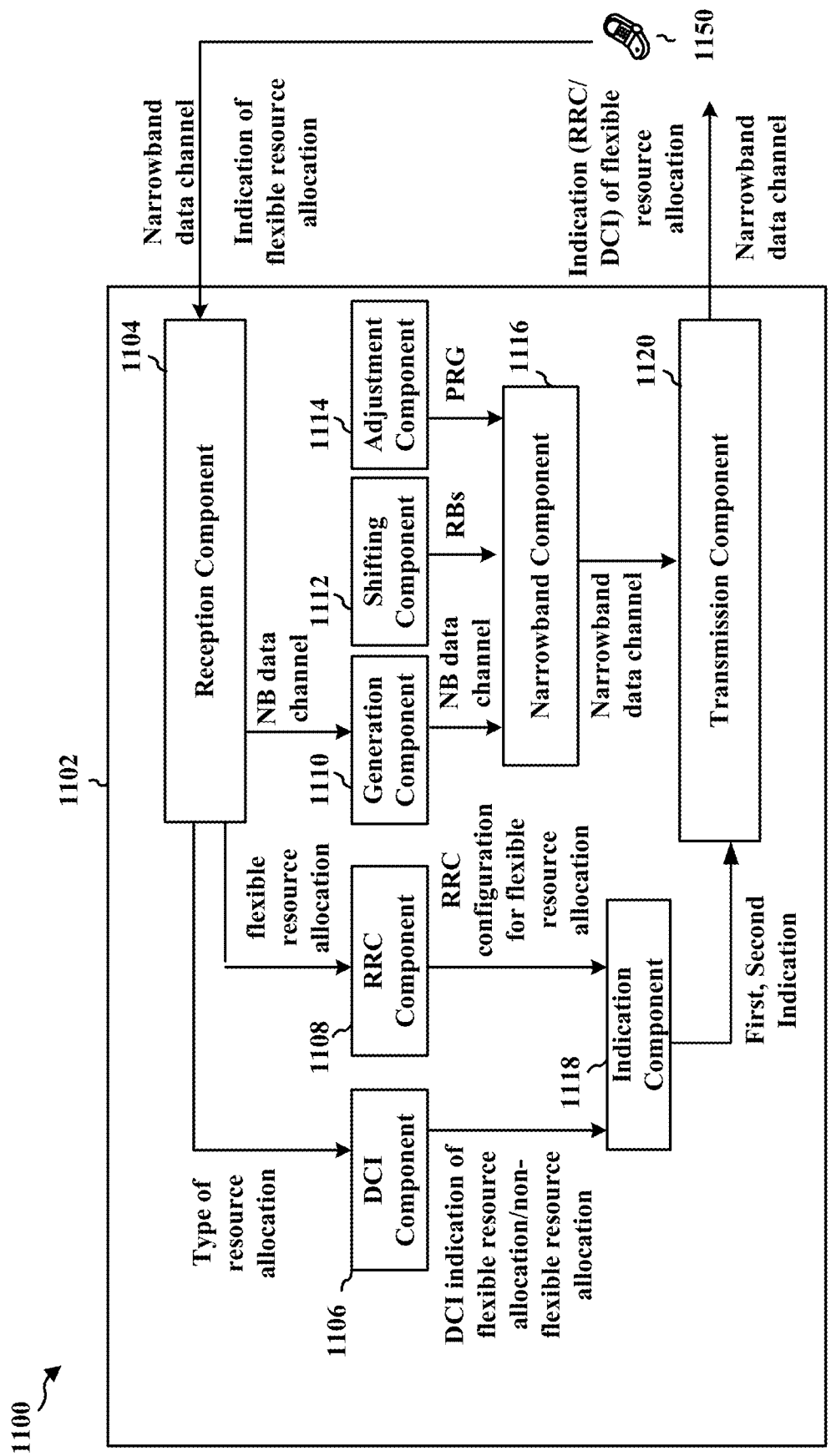
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station or a component of a base station. The apparatus includes a DCI component 1106 that is configured to dynamically switch between an additional type of resource allocation, e.g., in which the narrowband data channel is transmitted without adjusting the PRG, and a flexible RB allocation in which the narrowband data channel is transmitted with an adjustment to the PRG, e.g., as described in connection with step 1012 above. The apparatus also includes an RRC component 1108 that is configured to configure, e.g., via transmission component 1120, a UE for a flexible resource allocation, e.g., as described in connection with step 1001 above. Also, the apparatus includes a generation component 1110 that is configured to generate a narrowband data channel including a plurality of RBs, e.g., as described in connection with step 1004 above. The apparatus further includes a shifting component 1112 that is configured to shift a position of the RBs to align with a wideband RBG boundary, e.g., as described in connection with step 1006 above. Additionally, the apparatus includes an adjustment component 1114 that is configured to adjust a PRG for the narrowband data channel, e.g., as described in connection with step 1008 above. Further, the apparatus includes a narrowband component 1116 that is configured to transmit, e.g., via transmission component 1120, the narrowband data channel to a UE based on adjusting the PRG, e.g., as described in connection with step 1010 above. The apparatus also includes an indication component 1118 that is configured to transmit, e.g., via transmission component 1120, an indication of a flexible resource allocation, e.g., as described in connection with step 1002 above, as well as transmit, e.g., via transmission component 1120, a second indication of the type of resource allocation, e.g., as described in connection with step 1014 above. The indication(s) may comprise RRC signaling or dynamic DCI signaling. The apparatus can also include reception component 1104 that is configured to receive data and/or resources from a UE, e.g., UE 1150.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
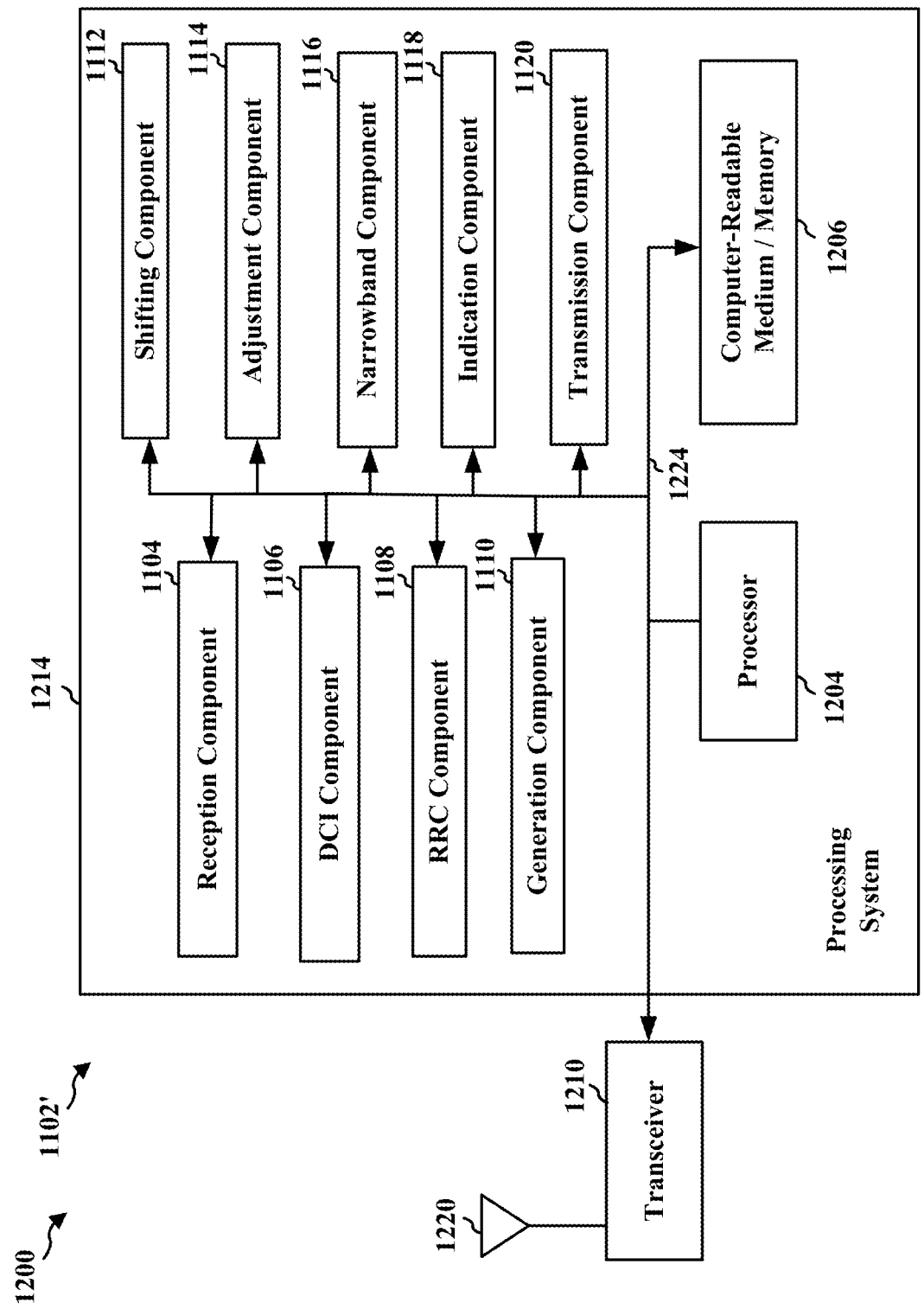
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1120, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375.

In one configuration, the apparatus 1102/1102' for wireless communication includes means for generating a narrowband data channel including a plurality of RBs. The apparatus can also include means for shifting a position of the plurality of RBs of the narrowband data channel to align with a wideband RBG boundary. The apparatus can also include means for adjusting a PRG for the narrowband data channel. The apparatus can also include means for transmitting the narrowband data channel to a UE based at least on adjusting the PRG. Further, the apparatus can include means for transmitting an indication to the UE indicating a flexible resource allocation. The apparatus can also include means for dynamically switching to an additional type of resource allocation, e.g., in which the narrowband data channel is transmitted without adjusting the PRG for the narrowband data channel. The apparatus can also include means for transmitting a second indication to the UE indicating the additional type of resource allocation. Additionally, the apparatus can include means for configuring the UE for a flexible resource allocation. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
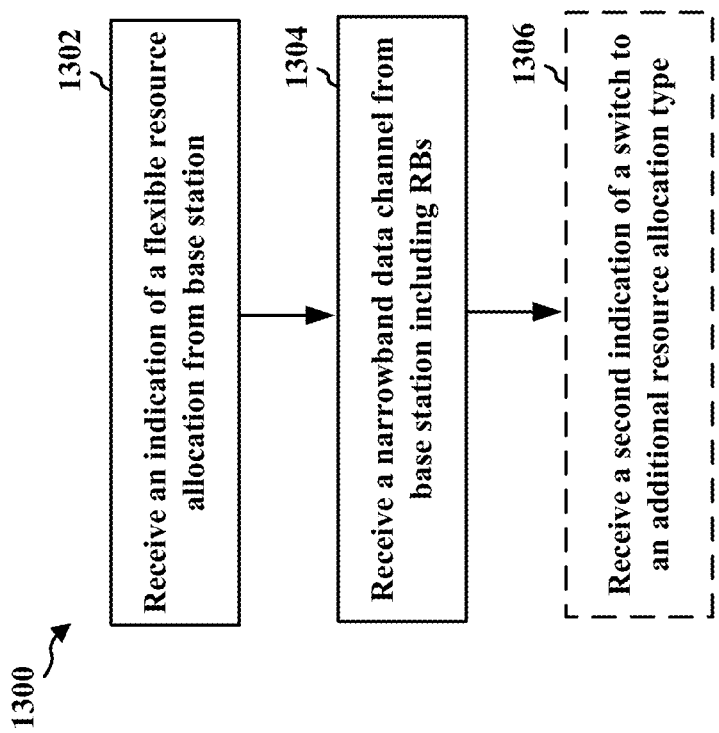
FIG. 13 is a flowchart of a method of wireless communication.

FIG. 13 is a flowchart 1300 of a method of wireless communication. The method may be performed by a UE or a component of a UE (e.g., UE 104, 350, 404, 902, apparatus 1402; processing system 1514, which may include the memory 360 and which may be the entire UE or a component of the UE, such as the TX processor 368, the RX processor 356, and/or the controller/processor 359) communicating with a base station (e.g., base station 102, 180, 310, 402, 904, apparatus 1102). Optional aspects are illustrated with a dashed line. The methods described herein can provide a number of benefits, such as improving communication signaling, resource utilisation, and/or power savings.

At 1302, the UE can receive the indication of a flexible resource allocation from base station for a narrowband data channel, e.g., eMTC PDSCH. For example, indication component 1406 of apparatus 1402 may receive, e.g., via reception component 1404, the indication of a flexible resource allocation from base station for a narrowband data channel. The indication can be received in a DCI. In other examples, the indication may be comprised in RRC. For example, the UE can be configured for a flexible resource allocation in an RRC configuration, and the PRG for the narrowband data channel can be adjusted based on the UE being configured for the flexible resource allocation.

At 1304, the UE can receive the narrowband data channel from the base station.

For example, narrowband component 1408 of apparatus 1402 may receive, e.g., via reception component 1404, the narrowband data channel from the base station. The narrowband data channel may comprise plurality of RBs can also be associated with a narrowband, e.g., which may be grouped into PRB(s). A position of the plurality of RBs of the narrowband data channel can be shifted to align with a wideband RBG boundary, e.g., an LTE RBG boundary, as described in connection with the examples in 6A and 6B. Also, a PRG for the narrowband data channel can be adjusted, as described in connection with the examples in 7B-7C and 8B-8C.

In some aspects, the PRG can be adjusted for the narrowband data channel when the flexible resource allocation is indicated by the base station. Thus, the UE may use the indication received at 1302 in order to correctly receive the data transmission at 1304. The PRG for the narrowband data channel can also comprise one or more consecutive RBs. A beginning RB of the plurality of RBs can be aligned with the wideband RBG boundary, and the beginning RB of the PRG for the narrowband data channel can be aligned with the wideband RBG boundary. Alternately, a last RB of the plurality of RBs can be aligned with the wideband RBG boundary, and the last RB of the PRG for the narrowband data channel can be aligned with the wideband RBG boundary. In other aspects, a wideband PRG parameter, e.g., an LTE PRG boundary and/or size, can be applied for the narrowband data channel.

At 1306, the UE can receive a second indication from the base station indicating a switch of a type of resource allocation to an additional resource allocation type, e.g., a switch to a type in which the narrowband data channel does not have an adjusted PRG. For example, indication component 1406 of apparatus 1402 may receive, e.g., via reception component 1404, a second indication from the base station indicating a switch of a type of resource allocation to a resource allocation type. In some aspects, a size of the PRG can be fixed.

Figure 14:
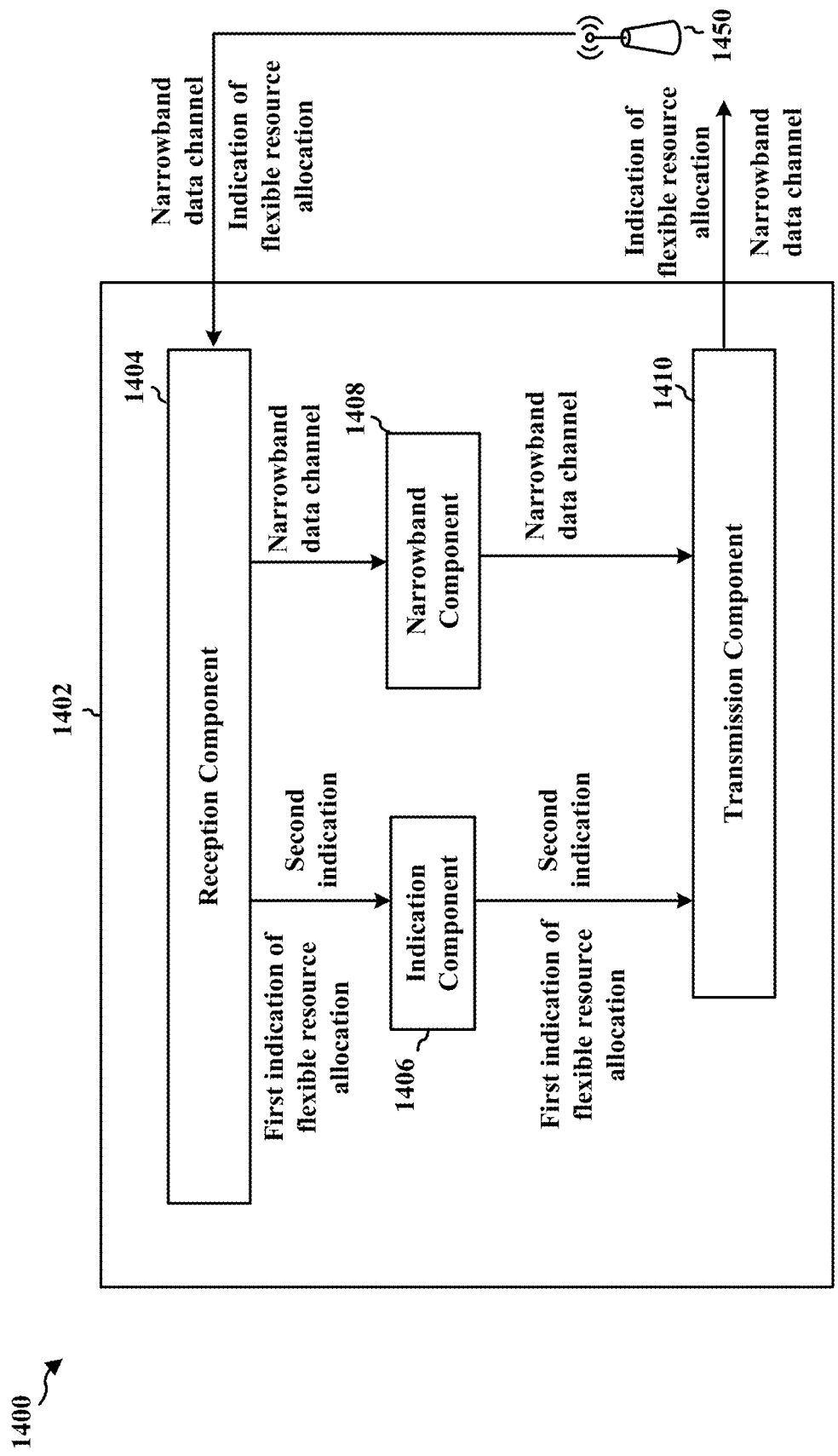
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE or a component of a UE. The apparatus includes an indication component 1406 that is configured to receive, e.g., via reception component 1404, an indication of a flexible resource allocation from base station, e.g., as described in connection with step 1302 above. Indication component 1406 can also be configured to receive, e.g., via reception component 1404, a second indication of a switch to an additional resource allocation type, e.g., in which the narrowband data channel does not have an adjusted PRG, e.g., as described in connection with step 1306 above. The apparatus can also include a narrowband component 1408 that is configured to receive, e.g., via reception component 1404, a narrowband data channel from base station including a plurality of RBs, e.g., as described in connection with step 1304 above. The apparatus can also include a transmission component 1410 that is configured to transmit data and/or resources to a base station, e.g., base station 1450, including the narrowband data channel, the indication of a flexible resource allocation, and the second indication.

The apparatus may include additional components that perform each of the blocks of the algorithm in the aforementioned flowcharts of FIGS. 9 and 13. As such, each block in the aforementioned flowcharts of FIGS. 9 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
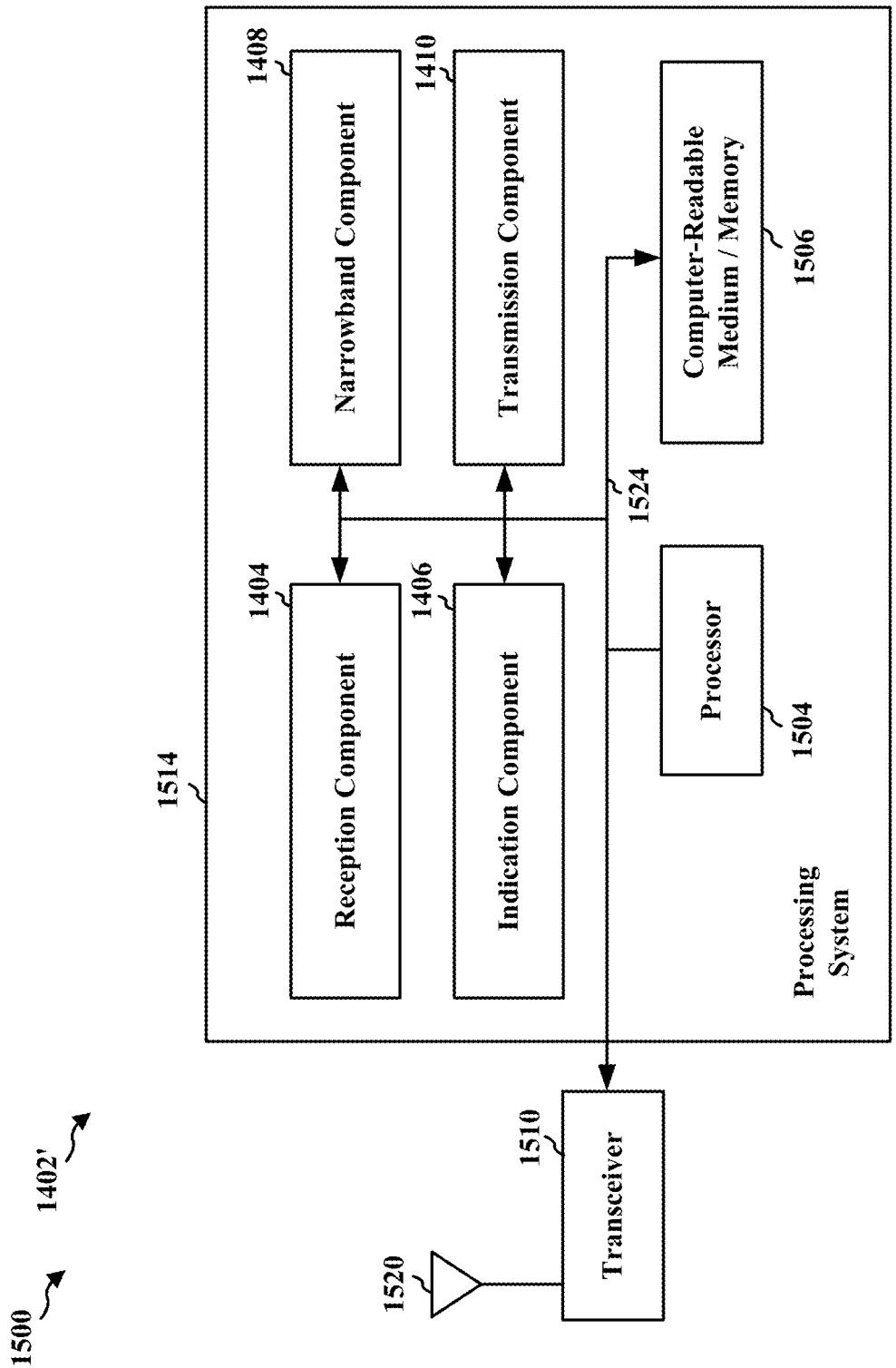
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for receiving an indication of a flexible resource allocation from a base station. The apparatus can also include means for receiving a narrowband data channel from the base station including a plurality of RBs. The apparatus can also include means for receiving a second indication from the base station indicating a switch of a type of resource allocation to an additional resource allocation type, e.g., in which the narrowband data channel does not have an adjusted PRG. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teaching described herein, without limitation.

Example 1 is a method of wireless communication at a base station, comprising: generating a narrowband data channel including a plurality of resource blocks (RBs); shifting a position of the plurality of RBs of the narrowband data channel to align with a wideband Resource Block Group (RBG) boundary; adjusting a Precoding Resource Block Group (PRG) for the narrowband data channel; and transmitting the narrowband data channel to a User Equipment (UE) based at least on adjusting the PRG.

In Example 2, the method of Example 1 further includes that the plurality of RBs are associated with a narrowband.

In Example 3, the method of Example 1 or 2 further includes that the PRG for the narrowband data channel comprises one or more consecutive RBs.

In Example 4, the method of any of Example 1-3 further includes that adjusting the PRG for the narrowband data channel includes aligning the beginning RB of the PRG with the wideband RBG boundary, and that the PRG is shifted based on the shifting the position of the plurality of RBs of the narrowband data channel.

In Example 5, the method of any of Example 1-4 further includes that adjusting the PRG for the narrowband data channel includes aligning the last RB of the PRG with the wideband RBG boundary, and that the PRG is shifted based on the shifting the position of the plurality of RBs of the narrowband data channel.

In Example 6, the method of any of Example 1-5 further includes transmitting an indication to the UE indicating a flexible resource allocation, wherein the base station adjusts the PRG for the narrowband data channel when the flexible resource allocation is indicated.

In Example 7, the method of any of Example 1-6 further includes that the indication is transmitted in a downlink control information (DCI).

In Example 8, the method of any of Example 1-7 further includes dynamically switching to an additional type of resource allocation, e.g., in which the narrowband data channel is transmitted without adjusting the PRG for the narrowband data channel; and transmitting a second indication to the UE indicating the additional type of resource allocation.

In Example 9, the method of any of Example 1-8 further includes configuring the UE for a flexible resource allocation, wherein the PRG for the narrowband data channel is adjusted based on the UE being configured for the flexible resource allocation.

In Example 10, the method of any of Example 1-9 further includes that the UE is configured for the flexible resource allocation using radio resource control (RRC) signaling.

In Example 11, the method of any of Example 1-10 further includes that a size of the PRG is fixed.

Example 12 is a system or apparatus including one or more processors and one or more memories in electronic communication with the one or more processors storing instructions executable by the one or more processors to cause the system or apparatus to implement a method as in any of Examples 1-11.

Example 13 is a system or apparatus including means for implementing a method or realizing an apparatus as in any of Examples 1-11.

Example 14 is a method of wireless communication at a UE, comprising: receiving an indication of a flexible resource allocation from a base station; and receiving a narrowband data channel from the base station including a plurality of resource blocks (RBs), and that a position of the plurality of RBs of the narrowband data channel is shifted to align with a wideband Resource Block Group (RBG) boundary, and that a Precoding Resource Block Group (PRG) for the narrowband data channel is adjusted.

In Example 15, the method of Example 14 further includes that the plurality of RBs are associated with a narrowband.

In Example 16, the method of Example 14 or Example 15 further includes that the PRG for the narrowband data channel comprises one or more consecutive RBs.

In Example 17, the method of any of Examples 14-16 further includes that the beginning RB of the PRG for the narrowband data channel is adjusted to be aligned with the wideband RBG boundary, and that the PRG is shifted based on the shifting of the plurality of RBs of the narrowband data channel.

In Example 18, the method of any of Examples 14-17 further includes that the last RB of the PRG for the narrowband data channel is adjusted to be aligned with the wideband RBG boundary, and that the PRG is shifted based on the shifting of the plurality of RBs of the narrowband data channel.

In Example 19, the method of any of Examples 14-18 further includes that the indication is received in a downlink control information (DCI).

In Example 20, the method of any of Examples 14-19 further includes receiving a second indication from the base station indicating a switch of a type of resource allocation to an additional resource allocation type, e.g., in which the narrowband data channel does not have an adjusted PRG.

In Example 21, the method of any of Examples 14-20 further includes that the UE is configured for the flexible resource allocation, and that the PRG for the narrowband data channel is adjusted based on the UE being configured for the flexible resource allocation.

In Example 22, the method of any of Examples 14-21 further includes that the UE is configured for the flexible resource allocation using radio resource control (RRC) signaling.

In Example 23, the method of any of Examples 14-22 further includes that a size of the PRG is fixed.

Example 24 is a system or apparatus including one or more processors and one or more memories in electronic communication with the one or more processors storing instructions executable by the one or more processors to cause the system or apparatus to implement a method as in any of Examples 14-23.

Example 25 is a system or apparatus including means for implementing a method or realizing an apparatus as in any of Examples 14-23.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   transmitting an indication to a user equipment (UE) indicating a flexible resource allocation;
   generating a narrowband data channel including a plurality of resource blocks (RBs);
   adjusting a Precoding Resource Block Group (PRG) for the narrowband data channel based on the indication, the adjusting the PRG for the narrowband data channel including shifting a position of the plurality of RBs of the narrowband data channel to align a beginning RB of the PRG or a last RB of the PRG with a wideband Resource Block Group (RBG) boundary; and
   transmitting the narrowband data channel to the UE based at least on adjusting the PRG.

2. The method of claim 1, wherein the plurality of RBs are associated with a narrowband.

3. The method of claim 1, wherein the PRG for the narrowband data channel comprises one or more consecutive RBs.

4. The method of claim 1, wherein adjusting the PRG for the narrowband data channel includes aligning the beginning RB of the PRG with the wideband RBG boundary, and wherein the PRG is shifted based on the shifting the position of the plurality of RBs of the narrowband data channel.

5. The method of claim 1, wherein adjusting the PRG for the narrowband data channel includes aligning the last RB of the PRG with the wideband RBG boundary, and wherein the PRG is shifted based on the shifting the position of the plurality of RBs of the narrowband data channel.

6. The method of claim 1, wherein the indication is transmitted in a downlink control information (DCI).

7. The method of claim 1, further comprising:
   dynamically switching to an additional type of resource allocation; and transmitting a second indication to the UE indicating the additional type of resource allocation.

8. The method of claim 1, further comprising:
configuring the UE for the flexible resource allocation, wherein the PRG for the narrowband data channel is adjusted based on the UE being configured for the flexible resource allocation.

9. The method of claim 8, wherein the UE is configured for the flexible resource allocation using radio resource control (RRC) signaling.

10. The method of claim 1, wherein a size of the PRG is fixed.

11. An apparatus for wireless communication at a base station, comprising:
means for transmitting an indication to a user equipment (UE) indicating a flexible resource allocation;
means for generating a narrowband data channel including a plurality of resource blocks (RBs);
means for adjusting a Precoding Resource Block Group (PRG) for the narrowband data channel based on the indication, the means for adjusting the PRG for the narrowband data channel being further configured to shift a position of the plurality of RBs of the narrowband data channel to align a beginning RB of the PRG or a last RB of the PRG with a wideband Resource Block Group (RBG) boundary; and
means for transmitting the narrowband data channel to the UE based at least on adjusting the PRG.

12. The apparatus of claim 11, wherein the plurality of RBs are associated with a narrowband.

13. The apparatus of claim 11, wherein the PRG for the narrowband data channel comprises one or more consecutive RBs.

14. The apparatus of claim 11, wherein means for adjusting the PRG for the narrowband data channel is further configured to align the beginning RB of the PRG with the wideband RBG boundary, and wherein the PRG is shifted based on the shifting of the plurality of RBs of the narrowband data channel.

15. The apparatus of claim 11, wherein means for adjusting the PRG for the narrowband data channel is further configured to align the last RB of the PRG with the wideband RBG boundary, and wherein the PRG is shifted based on the shifting of the plurality of RBs of the narrowband data channel.

16. The apparatus of claim 11, wherein the indication is transmitted in a downlink control information (DCI).

17. The apparatus of claim 11, further comprising:
means for dynamically switching to an additional type of resource allocation; and
means for transmitting a second indication to the UE indicating the additional type of resource allocation.

18. The apparatus of claim 11, further comprising:
means for configuring the UE for the flexible resource allocation, wherein the PRG for the narrowband data channel is adjusted based on the UE being configured for the flexible resource allocation.

19. The apparatus of claim 18, wherein the UE is configured for the flexible resource allocation using radio resource control (RRC) signaling.

20. The apparatus of claim 11, wherein a size of the PRG is fixed.

21. An apparatus for wireless communication at a base station, comprising:
memory; and
at least one processor coupled to the memory and configured to:
transmit an indication to a user equipment (UE) indicating a flexible resource allocation;
generate a narrowband data channel including a plurality of resource blocks (RBs);
adjust a Precoding Resource Block Group (PRG) for the narrowband data channel based on the indication, wherein to adjust the PRG for the narrowband data channel, the at least one processor is further configured to shift a position of the plurality of RBs of the narrowband data channel to align a beginning RB of the PRG or a last RB of the PRG with a wideband Resource Block Group (RBG) boundary; and
transmit the narrowband data channel to the UE based at least on adjusting the PRG.

22. The apparatus of claim 21, wherein the plurality of RBs are associated with a narrowband.

23. The apparatus of claim 21, wherein the PRG for the narrowband data channel comprises one or more consecutive RBs.

24. The apparatus of claim 21, wherein to adjust the PRG for the narrowband data channel, the at least one processor is configured to align the beginning RB of the PRG with the wideband RBG boundary, and wherein the PRG is shifted based on the shifting of the plurality of RBs of the narrowband data channel.

25. The apparatus of claim 21, wherein to adjust the PRG for the narrowband data channel, the at least one processor is configured to align the last RB of the PRG with the wideband RBG boundary, and wherein the PRG is shifted based on the shifting of the plurality of RBs of the narrowband data channel.

26. The apparatus of claim 21, wherein to transmit the indication, the at least one processor is configured to transmit the indication in downlink control information (DCI).

27. The apparatus of claim 21, wherein the at least one processor is further configured to:
dynamically switch to an additional type of resource allocation; and
transmit a second indication to the UE indicating the additional type of resource allocation.

28. The apparatus of claim 21, wherein the at least one processor is further configured to:
configure the UE for the flexible resource allocation, wherein the PRG for the narrowband data channel is adjusted based on the UE being configured for the flexible resource allocation.

29. The apparatus of claim 28, wherein the UE is configured for the flexible resource allocation using radio resource control (RRC) signaling.

30. The apparatus of claim 21, wherein a size of the PRG is fixed.

31. A method of wireless communication at a User Equipment (UE), comprising:
receiving an indication of a flexible resource allocation from a base station; and
receiving a narrowband data channel from the base station including a plurality of resource blocks (RBs), and
wherein a beginning RB or a last RB of a Precoding Resource Block Group (PRG) for the narrowband data channel is shifted to with a wideband Resource Block Group (RBG) boundary.

32. The method of claim 31, wherein the plurality of RBs are associated with a narrowband.

33. The method of claim 31, wherein the PRG for the narrowband data channel comprises one or more consecutive RBs.

34. The method of claim 31, wherein the beginning RB of the PRG for the narrowband data channel is adjusted to be aligned with the wideband RBG boundary, and wherein the PRG is shifted based on the shifting of the plurality of RBs of the narrowband data channel.

35. The method of claim 31, wherein the last RB of the PRG for the narrowband data channel is adjusted to be aligned with the wideband RBG boundary, and wherein the PRG is shifted based on the shifting of the plurality of RBs of the narrowband data channel.

36. The method of claim 31, wherein the indication is received in a downlink control information (DCI).

37. The method of claim 31, further comprising:
receiving a second indication from the base station indicating a switch of a type of resource allocation to an additional resource allocation type.

38. The method of claim 31, wherein the UE is configured for the flexible resource allocation, and wherein the PRG for the narrowband data channel is adjusted based on the UE being configured for the flexible resource allocation.

39. The method of claim 38, wherein the UE is configured for the flexible resource allocation using radio resource control (RRC) signaling.

40. The method of claim 31, wherein a size of the PRG is fixed.

41. An apparatus for wireless communication at a User Equipment (UE), comprising:
means for receiving an indication of a flexible resource allocation from a base station; and
means for receiving a narrowband data channel from the base station including a plurality of resource blocks (RBs), and
wherein a beginning RB or a last RB of a Precoding Resource Block Group (PRG) for the narrowband data channel is aligned with a wideband Resource Block Group (RBG) boundary.

42. The apparatus of claim 41, wherein the plurality of RBs are associated with a narrowband.

43. The apparatus of claim 41, wherein the PRG for the narrowband data channel comprises one or more consecutive RBs.

44. The apparatus of claim 41, wherein the beginning RB of the PRG for the narrowband data channel is adjusted to be aligned with the wideband RBG boundary, and wherein the PRG is shifted based on the shifting of the plurality of RBs of the narrowband data channel.

45. The apparatus of claim 41, wherein the last RB of the PRG for the narrowband data channel is adjusted to be aligned with the wideband RBG boundary, and wherein the PRG is shifted based on the shifting of the plurality of RBs of the narrowband data channel.

46. The apparatus of claim 41, wherein the indication is received in a downlink control information (DCI).

47. The apparatus of claim 41, further comprising:
means for receiving a second indication from the base station indicating a switch of a type of resource allocation to an additional resource allocation type.

48. The apparatus of claim 41, wherein the UE is configured for the flexible resource allocation, and wherein the PRG for the narrowband data channel is adjusted based on the UE being configured for the flexible resource allocation.

49. The apparatus of claim 48, wherein the UE is configured for the flexible resource allocation using radio resource control (RRC) signaling.

50. The apparatus of claim 41, wherein a size of the PRG is fixed.

51. An apparatus for wireless communication at a User Equipment (UE), comprising:
memory; and
at least one processor coupled to the memory and configured to:
receive an indication of a flexible resource allocation from a base station; and
receive a narrowband data channel from the base station including a plurality of resource blocks (RBs), and
wherein a beginning RB or a last RB of a Precoding Resource Block Group (PRG) for the narrowband data channel is aligned with a wideband Resource Block Group (RBG) boundary.

52. The apparatus of claim 51, wherein the plurality of RBs are associated with a narrowband.

53. The apparatus of claim 51, wherein the PRG for the narrowband data channel comprises one or more consecutive RBs.

54. The apparatus of claim 51, wherein the beginning RB of the PRG for the narrowband data channel is adjusted to be aligned with the wideband RBG boundary, and wherein the PRG is shifted based on the shifting of the plurality of RBs of the narrowband data channel.

55. The apparatus of claim 51, wherein the last RB of the PRG for the narrowband data channel is adjusted to be aligned with the wideband RBG boundary, and wherein the PRG is shifted based on the shifting of the plurality of RBs of the narrowband data channel.

56. The apparatus of claim 51, wherein to receive the indication, the at least one processor is configured to receive the indication in downlink control information (DCI).

57. The apparatus of claim 51, wherein the at least one processor is further configured to:
receive a second indication from the base station indicating a switch of a type of resource allocation to an additional resource allocation type.

58. The apparatus of claim 51, wherein the UE is configured for the flexible resource allocation, and wherein the PRG for the narrowband data channel is adjusted based on the UE being configured for the flexible resource allocation.

59. The apparatus of claim 58, wherein the UE is configured for the flexible resource allocation using radio resource control (RRC) signaling.

60. The apparatus of claim 51, wherein a size of the PRG is fixed.

* * * * *